L. ARKIN.
FASTENER.
APPLICATION FILED JUNE 12, 1918.
1,300,105.
Patented Apr. 8, 1919.
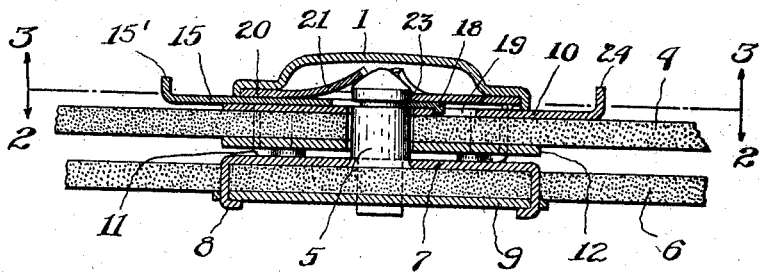
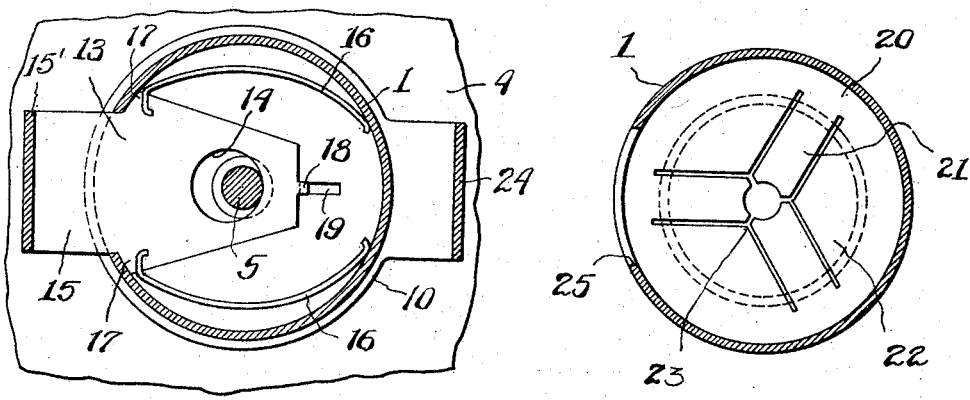
Inventor
Louis Arkin
by Roberts, Roberts & Cushman
his Attorneys

UNITED STATES PATENT OFFICE.

LOUIS ARKIN, OF BOSTON, MASSACHUSETTS.

FASTENER.

1,300,105.  Specification of Letters Patent.  Patented Apr. 8, 1919.

Application filed June 12, 1918. Serial No. 239,666.

*To all whom it may concern:*

Be it known that I, LOUIS ARKIN, citizen of the United States of America, and resident of Boston, in the county of Suffolk and State of Massachusetts, have invented new and useful Improvements in Fasteners, of which the following is a specification.

This invention relates to separable fasteners of the type comprising complemental stud and socket members commonly employed as a fastening means for gloves, dresses and the like, and more particularly to a fastener of the type disclosed in my former Patent 1,225,741, granted May 15, 1917, in which the stud is held in the socket by stud-retaining means and in which the stud is automatically ejected from the socket when released.

The principal object of the present invention is to provide improved means for ejecting the stud from the socket when released by the stud-retaining means, to center the stud in the socket and generally to improve fasteners of the type disclosed in my former patent.

In the accompanying drawings which illustrate the preferred embodiment of my invention,—

Figure 1 is a central longitudinal section of the fastener with the parts locked together;

Fig. 2 is a transverse section on the broken line in Fig. 1 viewed in the direction of the arrows 2—2; and Fig. 3 is a transverse section on the broken line in Fig. 1 viewed in the direction of the arrows 3—3.

The particular embodiment of my invention illustrated in the drawings comprises a socket casing 1 adapted to be secured to one piece of material 4 and a stud 5 secured to another piece of material 6 and adapted to fit into the socket 1. The stud may be secured to the material 6 in any suitable manner, but for the purpose of illustration I have shown it set into an opening in a plate 7 which is provided with four struck-up tongues 8 adapted to extend through the material and thence through openings in a plate 9 on the opposite side of the material 6, the ends of the tongues being bent over to hold the parts together.

The casing 1 is provided with a base 10 adapted to lie along one side of the material 4, and tongues 11 extend from the casing through slots near the outer edge of the base member 10, thence through the material 6, and thence through slots in a member 12 on the other side of the material 4, the ends of the tongues 11 being bent over to hold the parts together.

In order to hold the stud in the socket a stud retainer 13 is provided, this retainer preferably being in the form of a wedge-shaped plate having an opening 14 somewhat larger than the maximum diameter of the stud (Fig. 2). The retainer is provided with a projection 15 extending outwardly through a slot 25 in the side of the casing 1 and the outer end of the projection is turned up to provide a handle 15'. The retainer is urged outwardly by means of a pair of springs 16 extending into recesses in the opposite sides of the retainer at one end and bearing against the wall of the casing at the other end. The retainer is provided with a pair of shoulders 17 adapted to engage the wall of the casing on opposite sides of the slot 25 so as to limit the outward movement of the retainer, the shoulders 17 being so positioned that the retainer will extend into the groove in the end of the stud when the stud is inserted into the socket. At the inner end of the stud retainer is a finger 18 extending into the groove 19 in the base member 10, this pin and groove serving to prevent lateral movement of the inner end of the retainer.

Immediately above the retainer 13 is disposed a disk 20 which fits snugly into the casing 1. In the disk 20 a plurality of radial fingers 21 are cut so as to extend into the space above the stud-receiving aperture of the socket. These fingers are preferably three in number and are preferably curved inwardly at their inner ends concentrically with the axis of the socket so as to tend to center the stud. Between the fingers 21 are sectors 22 which have inner points 23 adapted to engage the periphery of the stud near its end. While these sectors are preferably pointed, they may be rounded at their inner ends so as to have either concave or convex ends and I intend the word sector to be generic to any such shape.

The disk 20 is made of elastic material such as brass or steel so that when the stud is inserted into the socket so as to flex the fingers 21 upwardly as shown in Fig. 1, the fingers tend to eject the stud. Thus when the retainer 13 is forced inwardly to release the stud the spring fingers 21 force the stud out of the socket.

As will be apparent from Fig. 1 the disk 20 and base 10 are spaced apart a distance substantially equal to the thickness of the retainer, so that the retainer and springs associated therewith are confined in this space.

In order to counteract the force applied to the handle 15' when actuating the retainer, at corresponding handle 24 is preferably formed integrally with the base 10 at the opposite side of the casing.

I claim:

1. A socket member of a fastener comprising a casing having a stud-receiving aperture, stud-retaining means associated with said casing, and a plate in said casing having a plurality of radial fingers cut therein so as to leave sections between the fingers, the sections being arranged to engage the stud near the end, and the fingers being arranged yieldingly to engage the end of the stud, whereby the stud is centered by the sections and when released is forced from the socket by the fingers.

2. A socket member of a fastener comprising a casing having a stud-receiving aperture, stud-retaining means associated with said casing, and a disk in said casing having a plurality of radial fingers cut therein so as to leave sectors between the fingers, the sectors being arranged to engage the periphery of the stud, and the fingers being arranged yieldingly to engage the end of the stud, whereby the stud is centered by the sectors and when released is forced from the socket by the fingers.

3. A socket member of a fastener comprising a casing having a stud-receiving aperture, a stud-retaining member wholly surrounding the path of the stud, said member being movable outwardly and inwardly respectively into stud-retaining and stud-releasing positions, means yieldingly urging said member outwardly, means for forcing said member inwardly to release the stud and a resilient member adapted to be engaged and stressed by the insertion of the stud into the socket to force the stud from the socket without manipulation of said stud.

4. A socket member of a fastener comprising a casing having a stud-receiving aperture, a stud-retaining member movable outwardly and inwardly respectively into stud-retaining and stud-releasing positions, yielding means urging said member outwardly, said member having a projection extending from the casing on one side and said casing having a projection on the opposite side.

5. A socket member of a fastener comprising a casing having a base member apertured to receive a stud, a thin stud retainer disposed along the inner face of the base member, and a plate spaced from the base member by the thickness of the stud retainer, the plate having a plurality of radial fingers cut therein so as yieldingly to engage the end of the stud and to eject the stud when released from the retainer.

6. A socket member of a fastener comprising a casing having a stud-receiving aperture, a stud retaining member wholly surrounding the path of the stud and provided with oppositely disposed recesses, said member being movable outwardly and inwardly respectively into stud retaining and stud releasing positions, a pair of springs extending into said recesses at one end and bearing against the wall of the casing at the other end yieldingly to urge said retaining member outwardly and means for forcing said member inwardly to release the stud.

7. A socket member of a fastener comprising a casing having a base member provided with a stud-receiving aperture and a groove, a stud retaining member wholly surrounding the path of the stud and provided with a finger extending into said groove, said member being movable outwardly and inwardly respectively into stud-retaining and stud releasing positions, means yieldingly urging said member outwardly, and means for forcing said member inwardly to release the stud.

Signed by me at Boston, Massachusetts, this eighth day of June, 1918.

LOUIS ARKIN.

Copies of this patent may be obtained for five cents each, by addressing the "Commissioner of Patents, Washington, D. C."